Craun et al.

[11] Patent Number: 5,025,063
[45] Date of Patent: Jun. 18, 1991

[54] IONOMERIC COATINGS

[75] Inventors: Gary P. Craun, Berea; Barbara L. Kunz, Strongsville, both of Ohio

[73] Assignee: The Glidden Company, Cleveland, Ohio

[21] Appl. No.: 397,278

[22] Filed: Aug. 23, 1989

[51] Int. Cl.$^5$ ............................. C08K 3/08; C08K 3/22
[52] U.S. Cl. .................................... 524/560; 523/435; 523/400; 523/334; 525/480; 525/530; 525/533
[58] Field of Search ...................... 523/435, 400, 334; 524/560; 525/480, 530, 533

[56] References Cited

U.S. PATENT DOCUMENTS 3,976,617  8/1976  Vasta .................................. 523/435

Primary Examiner—Joseph L. Schofer
Assistant Examiner—Jeffrey T. Smith
Attorney, Agent, or Firm—Thomas M. Schmitz

[57] ABSTRACT

Heat cured, thermoset protective surface coating films applied to a substrate are produced preferably by a dual cure of a polymeric ionomeric binder comprising zinc modified carboxyl functional epoxy-ester polymers. The epoxy-ester polymer contains both carboxy and hydroxyl functionality and coreacts with a zinc salt selected from a zinc carbonate or an organic zinc salt having a pKa above about 3.0. Upon heat curing, the carboxyl and hydroxyl groups crosslink while the zinc forms a zinc cluster to produce a thermoset film.

14 Claims, No Drawings

IONOMERIC COATINGS

BACKGROUND OF THE INVENTION

Protective or surface coatings are organic compositions applied to substrates to form continuous films which are cured or otherwise hardened to provide protection as well as a decorative appearance to the substrate. Protective surface coatings ordinarily comprise an organic polymeric binder, pigments, inert fillers and other additives. The polymeric binder functions as a dispersant for the pigments, inerts, and other additives in wet coating compositions and further functions as a binder for the pigments and inert fillers in the cured or hardened paint film. Polymeric binders can be thermoplastic or thermosetting binders based on coreactive components such as a reactive functional polymer adapted to crosslink or coreact with a crosslinking component such as melamine, isocyanate, or epoxy.

Conventional thermosetting polymers often require high temperatures as well as external crosslinkers. Some crosslinkers, such as melamines in conventional industrial coatings or triglycidyl isocyanurate for powder coatings, can cause toxicity problems. Also, the release of volatile by-products, such as caprolactam, from some of these materials can cause film defects, such as cratering and bubbling.

It now has been found that excellent paint coatings can be produced based on a dual cure of esterifiable ionomeric polymeric binder comprising a carboxylic acid functional polymer of an epoxy-ester polymer which is at least partially neutralized with an organic zinc salt such as zinc acetate, zinc propionate, or a similar organic zinc salt, or the zinc inorganic salt of zinc carbonate to form an ionomer. In addition to ionomer formation, epoxy-esters can self-cure through an esterification reaction between excess carboxyl groups and hydroxyl groups on the epoxy backbone.

The epoxy-ester polymer was found to provide interreacting polymer chains which exhibit thermosetting properties comparable to coreactive polymeric binders crosslinked by an amino crosslinker. An ionomer can be defined as a polymer composed of a polymeric backbone containing a small amount of pendant carboxylic acid groups, usually less than 15 mole percent, which are neutralized partially or completely with an organic zinc salt or zinc carbonate to form an ionomer. These ionic moieties and their interactions dominate the behavior of the polymer itself where it is believed that the zinc ions are exchanged for a hydrogen ion of the polymer carboxyl group. Ionic hydrocarbon polymers for elastomers or plastics are disclosed in U.S. Pat. No. 3,264,272.

In accordance with this invention, changes in the properties of polymeric binders for paint coatings can be achieved through the introduction of zinc metal ions by way of an organic zinc salt or zinc carbonate where modification of polymer properties is believed due to aggregation of ions. For example, the coreaction of two ion pairs on adjacent polymer chains results in a four-centered aggregate which behaves essentially like a crosslink. Among the dramatic effects that have been observed with paint compositions are increases in the moduli, increases in glass transition temperatures, and increases in viscosities. The formation of ionomeric clusters in protective surface coatings causes the acid functional polymers to behave like a phase-separated block copolymer. The use of ionomers in powder coatings is particularly advantageous since it permits control of the process such that the temperature during extrusion is lower than that of the volatilization temperature of the counterion (in the acid form). Thus, the ionomeric crosslinks are not formed to a significant extent during processing of the coating or application to a substrate, or during flow out and leveling to form a smooth continuous film. In this invention, the majority of the ionomer formation takes place during the bake cycle which comprises temperatures higher than the temperature where the salt will melt or solubilize and participate in an equilibrium reaction of the acid functional polymer. Baking and curing conditions can be controlled so that the ionomer formation occurs during baking where temperatures are adjusted to that of the volatilization temperature of the acidified counterion. The ionomeric formations can be observed in powder coatings especially as well as solvent borne coatings such as high solids coatings.

The unique properties of ionomers offer an alternate curing mechanism for solvent and high solids coatings generally, and powder coatings especially, with potential for lower baking temperatures, less films defects, a unique balance of physical properties, less toxic curing chemistry, thermal reversibility and lower cost. Thus, the addition of low levels of ionic zinc groups to acid functional epoxy-ester polymeric binders has been found to have dramatic effects on the physical properties of the polymeric binder. Incorporation of zinc organic salts or zinc carbonate, for instance, causes an epoxy-ester polymer to exhibit improved film properties such as solvent resistance and hardness. Viscometry has also supported the formation of ionomeric domains in carboxylic acid functional systems, but with ionic crosslinking, these properties are known to be thermally reversible. Useful carboxyl epoxy-ester polymers characteristically exhibit low polarity, high hydrophobicity, and low hydrogen bonding characteristics. Zinc ionomers generally resist water or humidity and produce coatings which are not water sensitive. In addition to ionic crosslinking, the carboxyl functional epoxy-esters have the capacity to self-cure through an esterification reaction cure. The excess carboxyl groups in the epoxy-ester react under normal curing conditions with hydroxyl groups on the backbone of the epoxy moiety to form ester crosslinks. This esterification cure can produce good paint properties by itself, but superior properties can be obtained by including a zinc salt, such that a dual-cure is produced. The dual ionomeric-esterification cure produces films with superior hardness, flexibility, solvent resistance and weathering resistance. Good weathering resistance is not commonly obtained with paints containing large quantities of epoxy and, consequently, good weathering was surprising and unanticipated.

When zinc carbonate is used as the neutralizing salt, the esterification and ionomer cure produces water and carbon dioxide as by-products, so the ionomeric-ester co-cure is a low toxicity cure mechanism. In addition, various quantities of zinc salt can be added to achieve a balance of properties so this dual-cure system provides the paint formulator with a wide paint formulating latitude. These and other advantages of this invention will become more apparent by referring to the detailed description and illustrative examples.

SUMMARY OF THE INVENTION

Briefly, the coating composition of this invention is based on a polymeric binder comprising a carboxylic acid functional, epoxy-ester polymer, which is at least partially neutralized with organic zinc salt or zinc carbonate to produce an ionomer. The polymer is adapted to gel and provide esterification cure characteristics when heat cured as paint films, and can also provide ionomer characteristics if formulated as a dual cure system. Preferred coating compositions comprise powder coatings. Carboxylic acid functional epoxy-ester polymers contain ionizable carboxylic acid monomer sufficient to give an acid number of at least 10. Superior properties are obtained with at least 10% neutralization of the carboxylic acid by a zinc organic salt or zinc carbonate.

DETAILED DESCRIPTION OF THE INVENTION

The coating composition of this invention are based on a polymeric binder comprising a carboxylic acid functional epoxy-ester polymer which is at least partially neutralized with an organic zinc salt or zinc carbonate.

In regard to the epoxy-ester polymers, it is believed that polarity and/or the hydrogen bonding capacity of the preferred epoxy-ester polymers relates to their ability to form good ionomers. Polymers with low polarity and lower hydrogen bonding tendencies are generally hydrophobic. Ionic groups generally present in a hydrophobic environment have a greater tendency to associate in clusters or multiplets, thus avoiding the unfavorable hydrophobic environment. Bisphenol A type epoxies are sufficiently hydrophobic to produce good ionomers.

In accordance with a preferred with a embodiment of this invention, a carboxyl functional polymer comprising an epoxy-ester polymer provides a particularly useful ionomer. Upon curing with a zinc organic salt or zinc carbonate, the epoxy-ester ionomer cures by ionomeric linking and ester crosslinking to form hard films with excellent solvent, impact, and bend resistance along with other desirable film integrity properties. Epoxy-esters provide cured films exhibiting an excellent blend and balance of film physical properties, particularly in respect to cured film hardness and flexibility. Preferred coating compositions comprise powder coatings which require lower molecular weight polymers to permit processing and compounding along with good flow and leveling of the powder coating during the film formation and heat curing step. For good storage stability, powder coatings should have tack temperatures about 60° C. to avoid fusion. Thus, polymers useful in powder coatings necessarily require a high Tg and/or crystalline characteristics. Ionic domains in high molecular weight polymers provide toughness along with reinforcing the polymer and improving the polymer hardness properties. It appears that the combination of low molecular weight but high Tg in conjunction with hard ionic domains from ionic crosslinking can render ionomeric based powder coatings somewhat inflexible. However, the epoxy-ester ionomeric polymers in accordance with this preferred aspect of the invention provide excellent powder coatings wherein the cured films exhibit high hardness in combination with good flexibility. The reactive epoxy-ester comprises an ester reaction product of an epoxide functional resin and a carboxylic acid. For instance, suitable epoxy-ester polymers can be produced by reacting a monofunctional or difunctional or higher functional epoxide resin with a difunctional or polyfunctional carboxylic acid to produce a carboxyl functional epoxy-ester copolymer, as hereinafter described.

Epoxide functional resins which can be reacted with such carboxylic acids are characterized by the three-membered ether group:

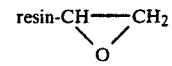

where any one of the hydrogens can be a lower alkyl group, and where said three-membered ring is commonly referred to as an epoxy or oxirane group, Where such groups typically terminate epoxy backbone chains and/or branched chains. Epoxy-ester groups are formed by esterification of an epoxy group with a carboxyl functional material to produce a hydroxy ester. Useful epoxide functional resin comprise conventional epoxy resins, glycidyl functional resins, and alkylene oxide resins. Epoxy resins are predominantly linear chain molecules comprising the coreaction product of polynuclear dihydroxy phenols or bisphenols with halohydrins to produce epoxy resins containing at least one and preferably two epoxy groups per molecule. The most common bisphenols are bisphenol-A, bisphenol-F, bisphenol-S, and 4,4'- dihydroxy bisphenol, with the most preferred being bisphenol-A. Halohydrins include epichlorohydrin, dichlorohydrin, and 1,2-dichloro-3-hydroxypropane with the most preferred being epichlorohydrin. Preferred epoxy resins comprise the coreaction product of excess molar equivalents of epichlorohydrin with bisphenol-A to produce predominantly an epoxy group terminated linear molecular chain of repeating units of diglycidyl ether of bisphenol-A containing between 2 and 25 repeating copolymerized units of diglycidyl ether of bisphenol-A. In practice, an excess molar equivalent of epichlorohydrin is reacted with bisphenol-A to produce epoxy resins where up to two moles of epichlorohydrin coreact with one mole of bisphenol-A, although less than complete reaction can produce difunctional epoxy resin along with monoepoxide chains terminated at the other end with a bisphenol-A unit. The most preferred linear epoxy resins are polyglycidyl ethers of bisphenol-A having terminating 1,2-epoxide groups and an epoxy equivalent weight between 140 and 5,000, and a number average molecular weight from about 280 to 10,000 as measured by gel permeation chromatography (GPC) as measured by ASTM methods such as D3536-76, D3593-80, or D3016-78. Commercially available lower molecular weight resins include Dow Chemical epoxy resins identified by trade number and average molecular weights as follows: DER 333 (380); DER 661 (525); while Shell Chemical epoxy resins are EPON 828 (380); EPON 836 (625); EPON 1001 (525); EPON 1007 F (4000); and Ciba-Geigy linear epoxy resins GT-7013 (1400); GT-7014 (1500); GT 7074 (2000); and GT-259 (1200). Although not as common, trifunctional epoxy resins are useful comprising branched chain epoxy resins where the branched chains as well as the backbone chain are each terminated with a terminal epoxide group to provide greater than two epoxide functionality. Trifunctional epoxy resins can be produced by coreacting epichlorohydrin with polynuclear polyhydroxy phenols, trifunctional phenols, or aliphatic trifunctional alcohols.

Epoxy resins further include non-aqueous alkylene oxide resins which are epoxide functional resins comprising an alkylene oxide adduct of a bisphenol compound. The alkylene oxide is an aliphatic alkyl derivative having up to about 26 carbon atoms although preferred oxides are lower alkyl oxides such as ethylene, propylene, and butylene oxides. Bisphenol compounds include bisphenol-A, bisphenol-F and bissulfone or sulfides. Typically two or more moles of alkyl oxide are coreacted with one mole of bisphenol compound. Preferred compositions are 2:1 molar reactions. Suitable molecular weight range of alkylene oxide resins is between 200 and 1,000 as measured by GPC.

Epoxy resins further include non-aqueous hydroxyl functional glycidyl acrylate or methacrylate copolymers with other ethylenically unsaturated monomers. Glycidyl monomers are oxirane functional monomers containing pendant ethylenic double bond unsaturation and includes, for example, acrylic, methacrylic, or vinyl derivatives of glycidol. Preferred oxirane monomers contain pendant oxirane and include glycidyl acrylate, glycidyl methacrylate, and allyl glycidyl ether. The oxirane monomers can be copolymerized in the absence of water with other ethylenically unsaturated monomers which include, for example, vinyl aromatic and aliphatic hydrocarbons such as styrene, alpha-methyl styrene and similar substituted styrenes, vinyl naphthalene, vinyl toluene, divinyl benzene, and vinyl aliphatic hydrocarbons such 1,3-butadiene, methyl-2-butadiene, 2,3-dimethyl butadiene, cyclopentadiene and dicyclopentadiene as well as ethylenically unsaturated esters and acids such as acrylic, methacrylic, ethacrylic, cinnamic and crotonic and the like and esters containing fumaric and maleic type unsaturation. Particularly preferred monomers include, for example, styrene, alpha-methyl styrene, tertiary butyl styrene, divinyl benzene, 1,3-butadiene, isoprene, alkyl acrylates such as ethyl acrylate, butyl acrylate, methyl-methacrylate, acrylonitrile, vinyl acrylate, and vinyl methacrylate as well as similar ethylenically unsaturated monomers. To provide hydroxyl functionality in the glycidyl polymer, hydroxy functional ethylenically unsaturated monomers can be copolymerized such as hydroxy alkyl acrylates or methacrylates. Preferred hydroxyl monomers are 2-hydroxy ethyl acrylate and methacrylate and 2-hydroxyl propyl acrylate and methacrylate. The monomer mixture on a weight basis can contain between 0.2% and 30% oxirane monomer, between 0% and 40% hydroxyl functional monomer, with the balance being other ethylenically unsaturated monomers.

The foregoing epoxy resin including alkylene oxide resins and glycidyl acrylate resins are coreacted with di or polyfunctional carboxylic acid compounds in accordance with this invention to produce an epoxy resin with both acid and hydroxyl functionality. Suitable linear dicarboxylic acids include oxalic acid, malonic acid, succinic acid, glutaric acid, adipic acid, pimelic acid, suberic acid, azelaic acid, sebacic acid, dodecane dicarboxylic acid, and dimer fatty acids. Aromatic dicarboxylic and polybasic acids include phthalic acid and anhydride, isophthalic acid, terephthalic acid, 1,3,5-trimesic acid, hexahydrophthalic acid. Excess levels of acid over epoxide functionality are used to produce a non-gelled acid functional resin. Generally 0.5 to 2.0 or more moles of diacid are used per equivalent of epoxy.

Diacids or polyacids are used with the epoxides at an excess equivalent of acid, such that the product is acid functional. For each epoxide equivalent, at least 1.3 and up to 4 or more equivalents of diacid or polyfunctional acid can be used with a preferred range being between 2 and 3 equivalents of di- or poly-carboxylic acid per equivalent of epoxide. Epoxy-ester molecular weight is increased at the lower acid levels through chain extension, and excess, untreated diacid remains in the resin at the higher levels. The excess carboxyl groups on the epoxy-ester provide the curing mechanism for both the zinc activated ionomeric link and the carboxyl-hydroxyl crosslink.

Epoxies will react with diacids at 100° to 140° C. without a catalyst, but the reaction proceeds quicker in the presence of a suitable nucleophile, such as tertiary amine. Good reaction rates in the presence of about 0.1% benzyldimethyl amine occur at about 80° to 140° C. Processing temperatures above 100° C. allow easier handling of the resin solution. Solvent stripping can be done under vacuum at 100° to 150° C. Temperatures above 220° C. should be avoided, because resin degradation can occur. These epoxy-esters can be prepared using reactive extrusion techniques. In this case, the epoxy resin, diacid, initiator, and nucleophile are premixed, then allowed to react under suitable temperature conditions in extrusion-type equipment. In this procedure, the zinc salts may be added along with pigments, flow modifiers, and other additives to the molten polymer blend, and solvent stripping is eliminated.

Preferred epoxy-esters are prepared from standard bisphenol A type epoxies and diacids. For powder paints, epoxy and diacid can be dissolved in toluene, heated to 110° C., and then allowed to react in the presence of about 0.1% tertiary amine. Solvent is stripped off to give a powder resin with a tack temperature above 50° C. Resins are blended on a two roll mill or in an extruder with a zinc organic salt, such as zinc propionate or zinc acetate, or zinc carbonate at about 10 to 150% neutralization, based on acid content of the resin. The resin is ground, sprayed onto parts electrostatically, and then baked under normal powder coating conditions. Oven temperatures of 350° to 400° F. are suitable.

Referring next to the ionizable organic zinc salt useful for converting carboxyl polymers into ionomers, the protonated counterion of the zinc salt characteristically has a pka above about 3.0 and preferably above 3.8 at ambient temperatures. The zinc salt organic counterion in its protonated form should volatilize in the curing temperature range to combine the carboxylic acid functional polymer with the zinc salt. It is believed that when the acid in the epoxy-ester polymer is substantially weaker, the polymer carboxyl group will essentially remain in its protonated form. Conversely, when the acid in the copolymer is the stronger acid, its proton will be loosely held and will be readily available to react with the zinc ion. Accordingly, preferred epoxy-ester polymers require zinc organic salts which have protonated counterions with an appropriate pka to allow significant ionic interaction with the epoxy-ester carboxylic acid groups and provide crosslinking type polymeric properties in accordance with this invention. Thus, acids weaker than, for example, acrylic or methacrylic acid and having approximately equivalent or higher pka than these acids provide the desired ionic interaction between ionic polymer chains to provide ionomeric links (ionic crosslink) cured polymer structures. Accordingly, useful zinc organic salts include for example those compounds listed in the following Table A.

TABLE A

| Salt | M.P. (°C.) | B.P. (°C.) of Protonated Counterion | pKa of Protonated Counterion |
| --- | --- | --- | --- |
| Zn Propionate | 185 | 141 | 4.87 |
| Zn Pentanoate | 100 | 186 | 4.84 |
| Zn Butyrate | >200 | 163 | 4.82 |
| Zn Hexanoate | >200 | 206 | 4.85 |
| Zn Stearate | 120 | 358 | 4.08, 9.85 |
| Zn Salicylate | >200 | 211 | 4.06, 9.92 |
| Zn Pivalate | >200 | 164 | 5.03 |
| Zn Heptanoate | >200 | 223 | 4.89 |
| Zn Saccharate | >200 | 125 | 5.00 |
| Zn Octanoate | 143 | 239.3 | 4.90 |
| Zn Benzoate | >200 | 249 | 4.20 |
| Zn Acetate | 237 | 116 | 4.76 |
| Zn Laurate | 128 | 131 | 4.89 |
| Zn Butenoate | >200 | 185 | 4.68 |
| Zn Ascorbate | >200 | 190 | 4.10, 11.80 |
| Zn Cyclohexylacetate | >200 | 243 | 4.51 |
| Zn Decanoate | >200 | 270 | 4.95 |
| Zn Carbonate | >200 | — | 10.33 |

Useful zinc organic salts having the desirable ionic characteristics for carboxylic acid epoxy-ester binders have protonated counterions with a pka above about 3.0 and preferably above about 3.8 where protonated counterions exhibit a boiling point above about 80° C. for use in powder coatings to enable the organic salt to volatilize during the heat curing step or to enable the zinc salt to be soluble in the acid copolymer.

Useful inorganic zinc salts comprise salt carbonate which is intended to include in-situ formations of zinc carbonate formed when combined with the carboxylic functional polymer of this invention.

In accordance with this invention, the useful level of neutralization of the carboxylic acid functional, epoxy-ester polymer, based on the equivalent of zinc salt added per equivalent of available carboxylic acid functionality in the copolymer, is above 10% and preferably between 30% and 150% and most preferably between 50% and 100% neutralization. In this regard, it has been found that excess neutralization of available carboxyl groups on the epoxy-ester does not interfere with the esterification cure crosslinking reaction occurring during heat curing. Thus, even though 100% of the available carboxyl groups are neutralized with zinc compounds, the esterification crosslinking still occurs tom some extend as a competing reaction and is believed to dominate in preference to the ionomeric link.

In accordance with this invention, the ionomeric binder is useful in powder and solvent-borne coatings to provide thermoset-like properties to a heat cured paint film. By properly balancing the hydrophobicity and polarity of the ionomeric polymers of this invention, thermoset, crosslinked-type properties can be achieved upon heating to induce the desired ionomeric clustering in accordance with this invention. Suitable processing temperatures for the ionomer must minimize the amount of ionomeric interactions or clustering during the melt-mixing step of the powder paint which, ordinarily, dictates mixing at temperatures slightly above the tack temperature of the carboxylic acid polymer but less than the volatilization temperature of the acidified counterion of the zinc organic salt or zinc carbonate. Thus, thermal curing of the powder paint can be readily achieved during the curing cycle without premature gellation of the powder coating. Resulting paint film integrity properties resemble crosslinked polymer networks and exhibit high film hardness as well as considerable resistance to solvent and water. Zinc organic salts useful in powder coatings preferably are solid at ambient temperatures (25° C.) with a melting point less than the intended curing temperatures or the salt must be soluble in the acid polymer. The organic counterion of the zinc salt in its protonated form preferably volatilizes during the intended curing cycle.

Cured paint films produced in accordance with this invention provide ionomeric interactions or clustering between ionomer polymer chains in a crosslink-type fashion to produced cured paint films exhibiting considerable MEK resistance, water resistance, improved hardness, and other film integrity properties.

The merits of this invention are further illustrated in the following examples.

EXAMPLE 1 a. Prepare a resin from 1600 g GT-7013 epoxy, Ciba-Geigy
584 g adipic acid
1000 g toluene
2.0 g benzyldimethyl amine Heat the above under nitrogen to 110° C., and stir for 3 hours. Raise the pot temperature to 140° C., while collecting distilled solvent. Apply a vacuum to remove more solvent. Remove viscous resin from the flask.

b. Preparation of Powder Paint Ionomer Samples

Stoichiometric quantities of copolymer, zinc organic salt, and other additives were weighed out and placed into a stainless steel Vita-Mix Model 3600 blender. The sample chunks were broken by pulsing the Vita-Mix until the larger pieces were crushed. The samples were pulverized by grinding at high speed for 15 seconds in the forward mode and 15 seconds in the reverse mode. The powdered material was placed in polyethylene bags.

The powdered pre-mixed samples were melt-mixed using a Brabender two roll, water cooled mill. The mill was set to the appropriate melting temperature of the materials to be mixed and turned on in the forward mode. The powdered samples were sprinkled slowly over the hot roll and allowed to melt and mix by adjusting the spacing at the nip. When the entire sample was on the mill, the speed was adjusted to the highest setting. The sample was mixed for three minutes, with scraping and remixing every one minute. The molten sheet of resin was scraped from the mill and cooled to room temperature. The melt-mixed samples were broken into flakes by using a rubber mallet or the Vita-Mix blender. These flakes were fed into a Brinkman or Tecator grinder using a vibratory bed and a 0.5 micron screen at low speed. When the entire sample was ground, it was removed from the grinder and was sieved through a 120 mesh brass or stainless steel screen using a sieve shaker.

c. Panel Preparation

The prepared powder paint samples were collected and electrostatically sprayed over cold rolled steel at a film thickness of approximately 1.5 to 2.0 mils. The steel panels were baked at an appropriate baking temperature, cooled and evaluated for film performance.

d. Test Samples

Combine 100 g of the above with stoichiometric quantities of an appropriate zinc salt such as zinc propionate, blend the dry ingredients together in a standard laboratory high speed blender, and melt mix the powder on a Brabender two roll mill at a hot roll temperature of 120° C. (See Table I). Cool and pulverize the product in a Tecator grinder. Apply the clear powder coating to Parker Chemical Bonderite-1000 panels at 1–2 mils. Bake for 20 minutes at 400° F. in a gas fired oven.

EXAMPLE 2

2. Prepare as in Ex. 1, but use 752 g. azelaic in place of the adipic acid See Table I.

EXAMPLE 3

3. Prepare as in Ex. 1, but use 920 g. dodecanedioic acid in place of the adipic. See Table I.

TABLE 1

Epoxy-Ester Ionomeric Powder Coatings Examples 4 Through 12

| Example | Diacid Used | Zn salt (100% Neut.) | g salt/ 100 g polymer | Melt Proc. Temp. (°C.) | Pencil Hardness | MEK* Rubs | Reverse Impact (In.-lbs.) | Direct Impact (In.-lbs.) | Conical Mandrel |
|---|---|---|---|---|---|---|---|---|---|
| 4 | Adipic | None | 0 | 120 | H | 50 | 160 | 160 | Pass |
| 5 | Adipic | Propionate | 19.36 | 120 | 2H | 100 | 160 | 160 | Pass |
| 6 | Adipic | Carbonate | 11.48 | 120 | 5H-6H | 100 | 160 | 160 | Pass |
| 7 | Azelaic | None | 0 | 80 | HB | 80 | 160 | 160 | Pass |
| 8 | Azelaic | propionate | 17.96 | 80 | 4H | 100 | 160 | 160 | Pass |
| 9 | Azelaic | Carbonate | 10.64 | 80 | H | 100 | 160 | 160 | Pass |
| 10 | DDA | None | 0 | 90 | 2B | 20 | 5 | 30 | Cracks |
| 11 | DDA | Propionate | 16.80 | 90 | 2H | 100 | 160 | 160 | Pass |
| 12 | DDA | Carbonate | 9.96 | 90 | H | 100 | 20 | 40 | Cracks |

*Number of double rubs until breakthrough to substrate.

EXAMPLE 13

Solution Epoxy-Esters

Epoxy-esters were prepared by reacting adipic acid or azelaic acid or dodecanedioic acid with epoxy resin in xylene as described in Examples 1–3. A 10% solution of zinc propionate in DMSO was added to each polymer to provide 100% neutralization based on equivalent weight. Films were drawn down over Bonderite 1000 (Parker Chemical) using a 0.006 inch Bird blade. The films were baked at 400° F. for 20 minutes and the resulting cured film properties are shown in Table II.

TABLE II

| Property | DDA | Adipic | Azelaic |
|---|---|---|---|
| Pencil Hardness | | | |
| Unneutralized | 2B | H | HB |
| Neut. (ZnProp) | 2H | 2H | 4H |
| MEK Resistance* | | | |
| Unneutralized | 30 | 65 | >100 |
| Neut. (ZnProp) | >100 | >100 | >100 |
| Impact (in lbs.) | | | |
| Direct | | | |
| Unneutralized | <30 | >160 | >160 |
| Neut. (ZnProp) | >160 | >160 | >160 |
| Reverse | | | |
| Unneutralized | <5 | >160 | >160 |
| Neut. (ZnProp) | >160 | >160 | >160 |
| 60# Gloss (%) | | | |
| Unneutralized | 93.4 | 76.5 | 72.5 |
| Neut. (ZnProp) | 14.0 | 36.8 | 14.7 |

*Number of double rubs until break through to substrate.

EXAMPLE 14

Epoxy-ester Powders

Epoxy-esters described in Examples 1, 2, and 3 were evaluated as powder coatings using zinc propionate neutralization at 0 and 100% based on equivalent weight. Coatings were applied electrostatically to Bonderite 1000 (Parker Chemical) panels and baked for 20 minutes at 400° F.

Coating properties are illustrated in attached Table III.

TABLE III

| Property | DDA | | Adipic | | Azelaic | |
|---|---|---|---|---|---|---|
| Neut. | 0 | 100 | 0 | 100 | 0 | 100 |
| Film Build (mils) | 2.35 | 2.25 | 2.50 | 2.15 | 2.60 | 2.55 |
| Pencil Hardness | 2B | 2H | H | 2H | HB | 4H |
| MEK Resistance* | 30 | >100 | 40 | >100 | >100 | >100 |
| Impact (inch-lbs.) | | | | | | |
| Rev. | <5 | >160 | >160 | >160 | >160 | >160 |
| Direct | <30 | >160 | >160 | >160 | >160 | >160 |
| Viscosity (175° C.) (Poise) | | | | | | |
| Time = 60" | 8.0 | 78.0 | 55.0 | 45.0 | 17.0 | 22.0 |
| Time = 180" | 9.0 | 84.0 | 61.0 | Gel | 17.0 | 27.0 |

*Double rubs until breakthrough to substrate.

EXAMPLE 15

The epoxy-ester polymer as described in Example 1 was evaluated as a powder coating at various levels of neutralization by combination with zinc carbonate. Materials were melt mixed on a Brabender two roll mill, ground using a Tecator grinder, and sieved through a 140 mesh screen. These coatings were electrostatically sprayed over Bonderite 1000 (Parker Chemical) and baked for 20 minutes at 400° F. Coating properties are shown below. These results illustrate the esterification cure as acceptable coating properties are obtainable without zinc neutralization.

| % Neut. | 0 | 21.0 | 42.1 | 63.2 | 54.2 |
|---|---|---|---|---|---|
| MEK Resistance* | >100 | >100 | >100 | >100 | >100 |
| Pencil Hardness | 2H | 6H | 6H | 6H | 6H |
| Impact (inch-lbs.) | | | | | |
| Direct | >150 | >160 | >160 | >160 | >160 |
| Reverse | >150 | >160 | >160 | >160 | >160 |
| Gel Time (sec.) | 300 | 240 | 182 | 120 | 60 |
| MEK Dissolution (% Weight loss) | 11.66 | 1.55 | 1.30 | 0.74 | 1.28 |
| Viscosity (175° C.) (345 sec) | 140 p | 179 p | 214 p | 273 p | 364 p |

*Double rubs until breakthrough to substrate.

These five coatings were evaluated for Tg using differential scanning calorimetry (DSC). If ionomer formation is occuring, one would expect a shift in Tg or the appearance of a second Tg characteristic of the ionomeric phase.

Results show Tg increase with neutralization.

| % Neut. | DSC Tg |
|---|---|
| 0 | 35° C. |
| 21.0 | 39° C. |
| 42.1 | 45° C. |
| 63.2 | 54° C. |
| 84.2 | 60° C. |

EXAMPLE 16

Two polymers prepared as in Example 1 were evaluated as powder coatings neutralized with zinc carbonate.

| | Polymer A | | | Polymer B | | |
|---|---|---|---|---|---|---|
| % Neut. | 0 | 42.1 | 84.2 | 0 | 42.1 | 84.2 |
| 60° Gloss (%) | 66.1 | 92.9 | 46.3 | 77.4 | 71.8 | 65.4 |
| Impact (inch-lbs.) | | | | | | |
| Direct | >30 | >160 | >160 | >50 | >160 | >160 |
| Reverse | >10 | >160 | >160 | >70 | >160 | >160 |
| Conical Mandrel | fail (40 mm) | pass | pass | fail (65 mm) | pass | pass |
| MEK Resistance | >100 | >100 | >100 | >100 | >100 | >100 |
| (Double rubs until breakthrough to substrate). | | | | | | |
| Viscosity (Poise, 75° C., 225 sec) | 310 p | 391 p | 404 p | 312 p | 399 p | 499 p |

EXAMPLE 17

A polymer was prepared as in Example 1 and tested for coating properties (as described in earlier methodology). Resiflow PL200 (Estron Chemical, Inc.) and benzoin were added to the polymer/salt blend to aid in flow and leveling. Results shown below support dual cure esterification and ionomer formation.

| % Neut. | 0 | 25 | 50 | 75 | 100 |
|---|---|---|---|---|---|
| 60° Gloss (%) | 91.2 | 81.3 | 96.1 | 94.6 | 96.5 |
| Pencil Hard. | 3H | 6H | 8H | 6H | 6H |
| Knoop Hard. | 14.16 | 13.80 | 13.60 | 13.58 | 13.70 |
| MEK Resist. | >200 | >200 | >200 | >200 | >200 |
| (Double rubs until breakthrough to substrate) | | | | | |
| Impact (in lbs.) | | | | | |
| Direct | 30 | 100 | >160 | >160 | >160 |
| Reverse | 60 | 120 | >160 | >160 | >160 |
| Viscosity @ 175° C. poise (240 sec) | 185 | 183 | 239 | 223 | 257 |
| Weatherometer Exposure Total Color Change | | | | | |
| 660 hrs | 0.97 | 0.66 | 1.07 | 0.89 | 1.77 |
| 1491 hrs | 1.46 | 1.76 | 1.65 | 1.31 | 2.73 |

EXAMPLE 18

A polymer was prepared as in Example 1 and formulated into a pigmented powder coating at a 0.6 P:B using TiO$_2$, Resiflow PL200, (Estron Chemical, Inc.) benzoin, and ZnCO$_3$. The powder coating was melt mixed in a Brabender two Roll Mill, ground, and sieved. It was electrostatically sprayed onto Parker Bonderite 1000 cold rolled steel and baked for 20@4000° F.

Coating Properties:

| | Unneutralized | Neutralized |
|---|---|---|
| MEK Resistance | 75 | >250 |
| (Double rubs until breakthrough to substrate) | | |
| Impact (inch-lbs.) | | |
| Direct | <40 | >160 |
| Reverse | <20 | >160 |
| Conical Mandrel | Pass | Pass |
| Hardness | | |
| Pencil | 3H | 6H |
| Knoop (KHN) | 18.49 | 21.53 |

We claim:

1. A non-aqueous protective coating composition containing a thermosetting reactive polymeric binder, the binder comprising on a weight basis:

a carboxyl functional polymer having an Acid No. about 10 and a number average molecular weight between about 500 and 10,000, wherein the carboxyl functional polymer is an epoxy-ester copolymer comprising the reaction product of an epoxy resin with excess equivalents of dicarboyxlic acid comprising 1.3 to 4 equivalents of dicarboxylic acid per equivalent of epoxide, where said epoxy-ester copolymer contains hydroxyl group functionality and carboxyl group functionality; and said coating composition being heat curable and said carboxyl polymer being self-curing to coreact said hydroxyl groups with said carboxyl groups to form a thermoset coating film.

2. The coating composition of claim 1 where the binder includes a zinc salt selected from zinc carbonate, or an organic zinc salt having an acidified counterion with a pKa (dissociation constant in water) above about 3.0 where the ratio of said zinc salt to said carboxyl functional polymer is at a level such that the zinc salt neutralizes at least 10% of the equivalents of carboxyl functionality of the carboxyl functional polymer to form at least a partially zinc neutralized ionomer; and said coating composition being heat curable where the zinc salt coreacts with said carboxyl functional polymer and the zinc cation clusters with the carboxyl functional polymer to form ionomers.

3. A non-aqueous protective coating composition containing a reactive polymer binder, the binder comprising on a weight basis:

a carboxyl functional polymer having an Acid No. above 10 and a number average molecular weight between about 500 and 100,000, where the carboxyl functional polymer is an epoxy-ester copolymer having both hydroxyl groups and carboxyl groups;

a zinc salt selected from zinc carbonate or an organic zinc salt having an acidified counterion with a pKa (dissociation constant in water) above about 3.0 where the ratio of said zinc salt to said carboxyl functional polymer is at a level such that the organic zinc salt neutralizes at least 10% of the equivalents of carboxyl functionality of the carboxyl functional polymer to form at least a partially zinc neutralized ionomer; and said coating composition being heat curable and coreactive in a dual cure mechanism where the zinc salt coreacts with neutralized carboxyl groups and the zinc cation clusters with the carboxyl functional polymer to form ionomers while the remaining carboxyl groups coreact with hydroxyl groups.

4. The coating composition of claim 3 where the zinc salt is zinc carbonate.

5. The coating composition of claim 3 where the zinc salt is an organic zinc salt.

6. The coating composition of claim 3 where the carboxyl functional polymer has an Acid No. between 20 and 100.

7. The coating composition of claim 3 where neutralization of the carboxyl functional polymers by the zinc salt is between 30% and 200%.

8. The coating composition of claim 3 where neutralization of the carboxyl functional polymer by the zinc salt is between 50% and 150%.

9. The coating composition of claim 5 where the organic zinc salt is selected from zinc acetate, propionate, butyrate, pentanoate, hexanoate, octanoate, stearate, and laurate.

10. The coating composition of claim 3 where the epoxy-ester polymer comprises a coreaction product of a difunctional carboxylic acid with an epoxide functional resin.

11. The coating composition of claim 10 where the epoxide functional resin is a coreaction product of a bisphenol with a halohydrin.

12. The coating composition of claim 10 where the epoxide functional resin comprises an alkylene oxide adduct of a bisphenol compound.

13. The coating composition of claim 10 where the epoxide functional resin comprises glycidyl acrylate or methacrylate copolymerized with other ethylenic monomers.

14. The coating composition of claim 5 where the organic zinc salt has a pKa above about 3.8.

* * * * *